May 21, 1963
V. E. HOVELL
3,090,652
AUXILIARY SAFETY BRAKING SYSTEM
Filed Nov. 23, 1959
3 Sheets-Sheet 1
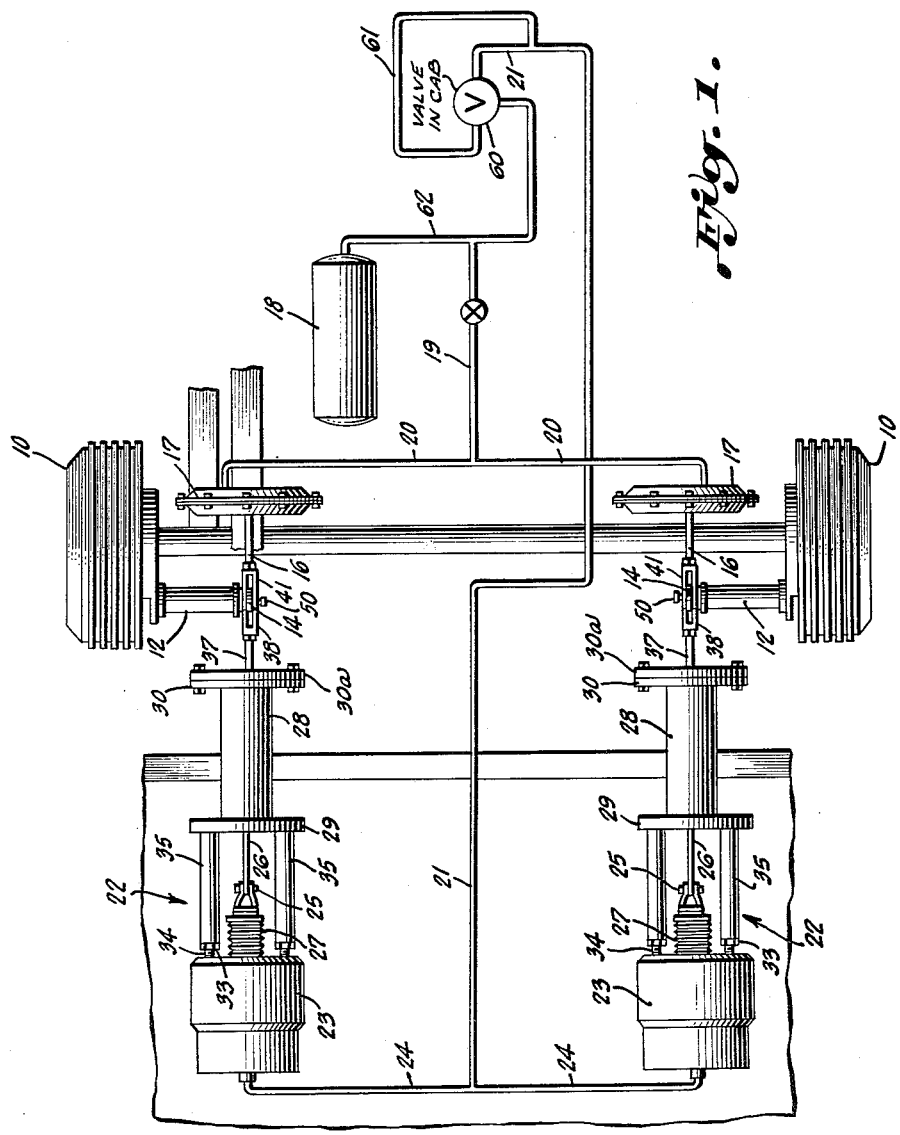
INVENTOR
VICTOR E. HOVELL
BY Charles L. Sturtevant
ATTORNEY

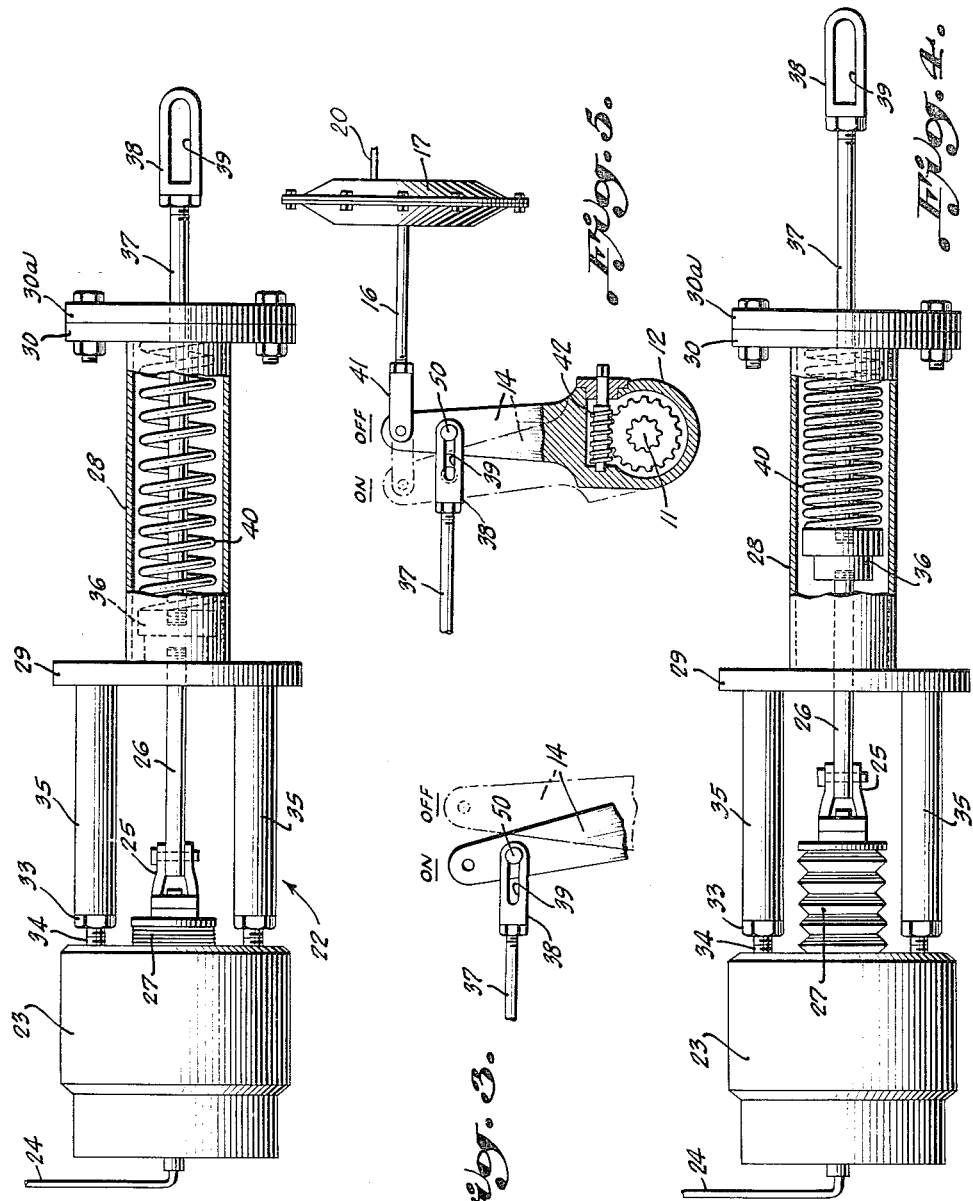

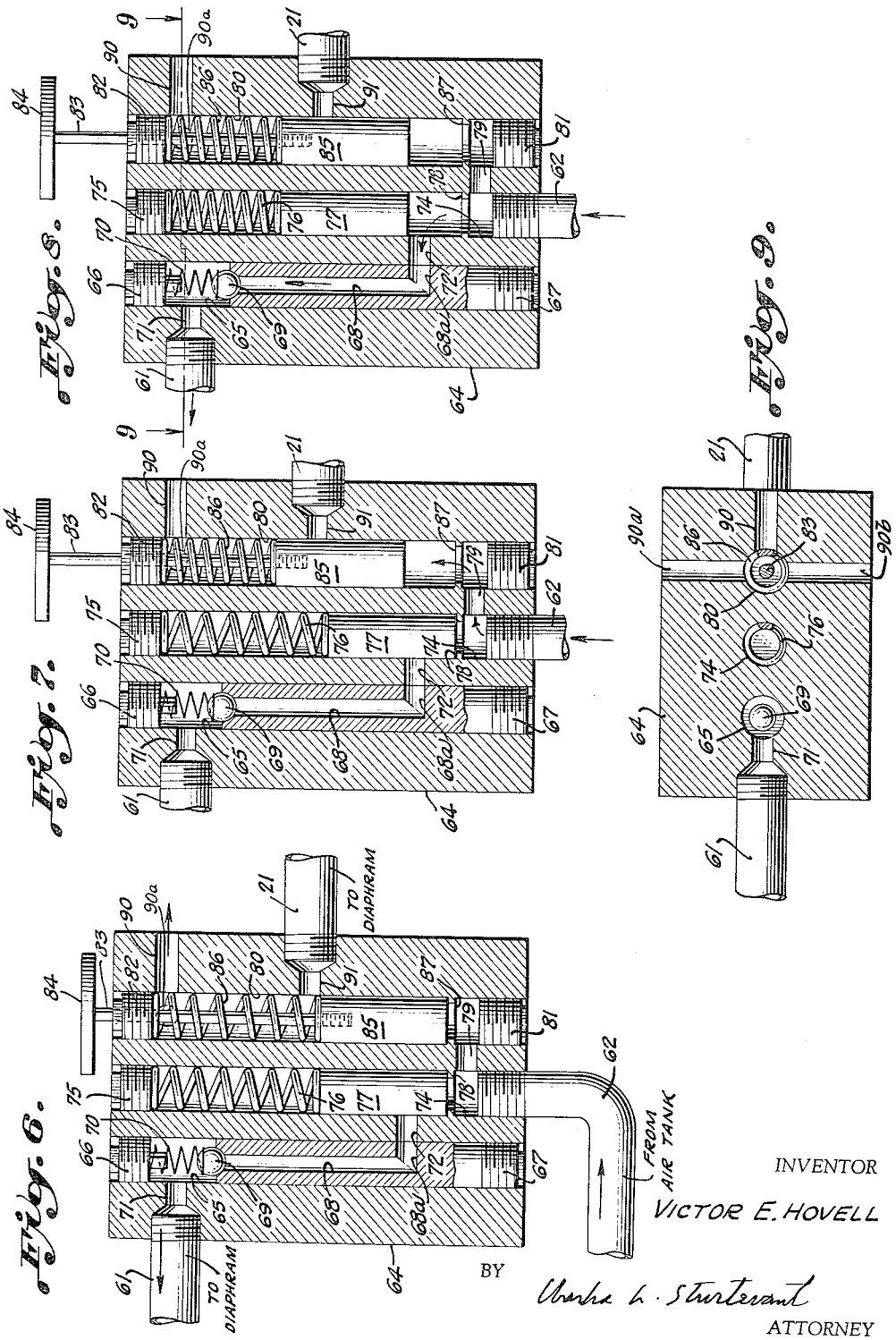

United States Patent Office 3,090,652
Patented May 21, 1963

3,090,652
AUXILIARY SAFETY BRAKING SYSTEM
Victor Edward Hovell, 28 Nomahegan Court,
Cranford, Union County, N.J.
Filed Nov. 23, 1959, Ser. No. 854,845
11 Claims. (Cl. 303—9)

The present invention relates to new and useful improvements in vehicle braking systems, and more particularly to such improvements in an air brake system for trucks, tractors, trailers and the like.

Most heavy trucks and trailers are equipped with air brakes in which necessary pressure is built up and maintained in a storage tank by a compressor. Actuation of the brakes releases air under pressure into a braking diaphragm, which is operatively connected with the brake rods or the like, to set the brakes. There have been provided separate mechanical emergency brakes for use when the conventional air brakes fail, but such mechanical brakes have not proved entirely satisfactory by reason of their relatively small area of contact with the shaft brake drum, thus giving slow response or when under extreme stress insufficient brake effort to stop the vehicle. There have also been provided visual and audible signals to indicate to a truck driver when the air pressure in the system has fallen or approaches an unsafe level, but here again reliance must be on the human element, that is, the willingness of the driver to stop and check the cause of trouble.

Relatively heavy trucks and truck trailers have been involved in serious accidents resulting in loss of life and heavy property damage. Generally, these accidents resulting from an uncontrolled moving truck have been caused by the lack of sufficient air pressure in the system to apply the brakes with the truck moving or to maintain the brakes set if a truck is parked on a slope. Moreover, extensive and repeated operation of the conventional air brakes will often result in the pressure in the system being reduced to a level such that the brakes are not properly applied and the driver may lose control of the truck under such circumstances.

One of the principal objects of the present invention is to provide an auxiliary safety braking system which may be preloaded and maintained in preloaded condition in operative association with the conventional braking system of a vehicle so that release of the preloaded safety braking system will apply the conventional system in the event of failure of the pressure in the conventional brake system or reduction of such pressure below a safe operating level.

Another object of the invention is to provide an auxiliary safety braking system substantially of the above type which is maintained in its preloaded condition through influence of the normal safe operating pressure in the system but with release of the safety braking mechanism from its preloaded condition when the pressure in the braking system fails or falls below a safe operating level.

A further object of the invention is to provide an auxiliary safety braking mechanism substantially of the above type which includes valving mechanism operable in response to pressure in the braking system to preload the auxiliary safety braking mechanism or release the same to automatically apply the vehicle brakes.

A still further object of the invention is to provide an auxiliary safety braking mechanism substantially of the above type wherein compression spring means is preloaded under influence of the braking pressure in the conventional braking system and maintained in preloaded condition when the braking pressure of the conventional braking system is at a safe operating level.

A still further object of the invention is to provide an auxiliary safety braking mechanism substantially of the above type wherein the valving mechanism controls passage of fluid pressure in the system to a diaphragm controlling preloading on release of the compression spring means.

It is a further object of this invention to provide an auxiliary safety braking mechanism substantially of the type set forth above which is extremely simple in construction; which consists of a minimum number of parts; which is readily attachable to trucks and truck trailers equipped with conventional air brake systems; and wherein the valving mechanism may be mounted in the driver's cab for protection against weather and wherein the valving mechanism may be manually operated by the driver to apply the brakes under influence of the auxiliary braking mechanism.

The above and other objects of the invention will in part be obvious and will be hereinafter more fully pointed out.

In the accompanying drawings:

FIG. 1 is a fragmentary schematic view showing the auxiliary safety braking mechanism of the present invention applied to the conventional air brake system of a truck, trailer or tractor;

FIG. 2 is an enlarged side elevation, partly in section, showing one unit of the auxiliary safety braking mechanism with the compression spring means in released brake-applying position;

FIG. 3 is a detail fragmentary view, similar to FIG. 5 described below, showing the brake actuating lever in the dotted line "off" position and in the full line "on" position when actuated by the auxiliary braking mechanism;

FIG. 4 is a view similar to FIG. 2 but showing the auxiliary safety braking mechanism in preloaded condition with the compression spring means compressed;

FIG. 5 is a detail fragmentary view showing the brake rod connections between the conventional air brake system and the operating plunger of the auxiliary safety braking mechanism of this invention, with the full line position of the actuating lever being the "off" position and with the dotted line position of the actuating lever being the "on" position when actuated by the conventional brake system;

FIG. 6 is a vertical sectional view through the valve housing showing the position of the valve elements therein prior to preloading the auxiliary braking system under influence of the fluid pressure from the conventional pressure system;

FIG. 7 is a sectional view, similar to FIG. 6, showing another relative positioning of the valve members as the fluid pressure in the brake system under normal operating conditions initiates positioning of the valve members to preload the auxiliary braking mechanism;

FIG. 8 is a sectional view, similar to FIGS. 6 and 7, but showing the ultimate positioning of the valve members when the normal safe pressure of fluid in the brake system sets the auxiliary braking mechanism in its preloaded condition; and FIG. 9 is a sectional view, taken substantially along the line 9—9 of FIG. 8.

Referring more in detail to the accompanying drawings and particularly to FIG. 1 at this time, the present invention is shown as applied to the rear end of a truck, tractor or trailer in relative position with respect to the conventional truck or trailer brake drums 10. The brake mechanism within the drums for each wheel is operated through a conventional rotary shaft 11 in a bearing 12 having a link 14 at the inner end thereof and connected to a brake rod 16 which is in the form of a plunger connected to a diaphragm within the diaphragm housing 17. Each diaphragm housing 17 is connected to a compressed air storage tank 18 by the conduit 19 and branch conduits 20, and the brakes are applied in conventional fashion by admitting the air under pressure to the diaphragm housings, thus to shift the rods 16 to the left, as seen in FIG. 5, and this movement of the rods shifts the links 14 which actuate the brake elements through each shaft within each bearing 12 in conventional manner.

Mounted in general alignment with the brake rods 16 are the auxiliary safety braking devices of the present invention, each of these braking devices being generally indicated by the numeral 22 as shown in FIG. 1. An auxiliary braking device is shown in more detail and in brake applying position in FIG. 2, and the description of one of these devices will be sufficient as both or any additional number thereof are substantially identical.

Each auxiliary braking mechanism includes a large diaphragm housing 23 which is in communication with the storage tank 18 through the conduit 21 and a branch conduit 24. The conduit 21 leads to the tank 18 through a valving mechanism 60 which will be hereinafter described. The diaphragm within each diaphragm housing 23 is connected as by a pin and clevis arrangement 25 with a reciprocating rod or piston 26, and the point of entry of this rod within the diaphragm housing is sealed by an expansible bellows 27. The area of the diaphragm within the diaphragm housing is such that with, for example, one hundred pounds per square inch as the normal pressure in the vehicle braking system, the diaphragm will exert an effort of about five thousand pounds on the rod 26.

At the right hand end of each auxiliary braking mechanism, as viewed in FIG. 2, there is provided a cylinder 28 with radially outwardly extending flanges 29, 30, 30a, threaded thereon and at opposite ends thereof. The flange 29 is secured to the diaphragm housing 23 by bolts 34 having nuts 33 thereon to confine elongated spacer sleeves 35 which, with the bolt connections, serve to definitely position and mount the flange 29 in predetermined position with respect to the diaphragm housing 23 and in a rigid assembly with the cylinder 28. The outer end of the rod 26 is connected to a head 36 movable through a complemental opening in the flange 29 and mounted for rectilinear movement within the cylinder 28. The head 36 is in turn connected to another rod 37 which projects outwardly from the opposite end of the cylinder 28 and through the flanges 30, 30a which are bolted together. The free end of the rod 37 has secured thereto a clevis member 38 in the arms of which are provided slots 39. A compression spring means 40 is disposed within the cylinder 28 between the head 36 and the flange 30a which serves as a seat therefor.

The end of the brake rod 16 is provided with a clevis 41 secured by a pin or the like to the rocking lever 14. A slack adjustment worm 42 (see FIG. 5) may be provided for rotating the shaft 11 within the bearing sleeve 12. In normal operation of the conventional brake system, air is admitted to the diaphragm housing 17 to shift the rod 16 to the left, as seen in FIG. 5; and to the dotted line "on" position of the lever 14.

The clevis member 38 at the end of the rod 37 is connected to pins 50 on the rocking lever 14. When the spring means 40 is compressed in the position of FIG. 4, the pins 50 are at the outer ends of the slots 39 in the full line position of FIG. 5. In this position, normal operation of the brakes through the conventional brake mechanism is permitted. Thus, the brake rod 16 can shift to the left to shift the rocking lever 14 to the brake applying position indicated by the dotted line position thereof. This movement is permitted by reason of the pins being free to slide in the slot 39 of the clevis 38.

Should the pressure in the system fall below a predetermined safe operating level, the preloaded spring means 40 is permitted to become extended to the position of FIG. 2 in accordance with operation of valve 60 as hereinafter pointed out. This expanding movement of the spring means will shift the rod 37 inwardly and in doing so the pins 50, being at the outer ends of the slots 39, will be engaged by the closed ends of the clevis arms to shift the lever 14 to the "on" position which is the full line position shown in FIG. 3. It may be here pointed out, by way of example, that the usual throw of a conventional brake rod is about two inches. With a compression spring 40 having a length, for example, of twelve inches in extended position, the loaded length of the spring may approximate eight inches which will shift the rod 37 a similar distance leaving a two inch lost motion connection for normal operation of the conventional brake rod. If the spring, in preloaded condition, exerts an effort of about five thousand pounds on the head 36, upon release of the latching mechanism the rod 37 will travel the normal throw of two inches for applying the brakes by means of the safety auxiliary mechanism. Thus, the spring, when released, will exert an effort of about twenty five hundred pounds on the brake operating lever 14, this being ample to effectively apply the vehicle brakes.

Referring to FIG. 1, the conduit 21 selectively communicates with the tank 18 through conduit 61, valve 60 and conduit 62 and the manner of this selective communication will be described by reference to FIGS. 6 through 9 illustrating the detail construction of the valve 60. The valve includes a housing 64 provided with a bore 65 closed at one end by a plug 66 and closed at the opposite end by a sleeve-like plug 67 having a longitudinally extending small bore 68 along the inner and intermediate portions thereof. The bore 68 provides at its inner end a seat for a ball valve 69 lightly urged towards seated position by a light spring 70 bearing on the ball 69 and the closing plug 67. The housing is provided with a port 71 providing communication between the conduit 61 and the bore 65 between the closing plug 66 and the ball valve 69. The opposite end of the bore 68 is provided with a lateral passage 68a communicating with a lateral port 72 in the housing.

The port 72 affords communication between the bore 68 and a bore 74 in the housing. The bore 74 is in communication with the conduit 62 leading to the supply tank 18. The opposite end of the bore 74 is closed by a plug 75. A coil spring 76 is interposed in the bore 74 between the closing plug 75 and a reciprocating plunger valve 77 which is limited in its movement in spring urged direction by a stop ridge 78 or the like. This valve 77 is to control communication between the conduit 62 and the bore 68 and conduit 61 in the manner to be hereinafter described.

At the lower end of the bore 74, there is a lateral port 79 in the housing affording constant communication between conduit 62 and a bore 80 in the housing. The end of the bore 80 adjacent the port 79 is closed by a plug 81. The opposite end of the bore 80 is closed by a plug 82 through which extends the shank 83 of a manual push member 84. The shank 83 is connected to a plunger type valve member 85 in the bore 80 and this valve 85 is also spring urged downwardly by a coil spring 86 interposed in the bore between the plug 82 and the valve. This valve may also be limited in its movement in a spring urged direction by a suitable stop 87 or the like. The housing is provided with three vent or exhaust passages 90, 90a, 90b (see FIG. 9) communicating with the bore 80 just within the closing plug 82 and opening to the atmosphere. Intermediate the bore 80, there is a port 91 affording selective communication between the bore 80 and the conduit 21. The valve 85 is for the purpose of controlling this port 91. In the position of FIG. 6, the valve is spring urged to its innermost position wherein the port 91 is in communication with the exhaust or vent ports 90, 90a, 90b through the communicant portion of the bore 80. In the positions of the valve 85 in FIGS. 7 and 8, the port 91 is closed thereby and there is no communication between the port 91 and the vent passages.

As previously indicated, the spring 70 is a light spring serving only to hold the ball check valve lightly against its seat to prevent backflow of air under pressure from the conduit 61 but permitting flow of air under pressure from the conduit 62 into the conduit 61 when the valve 77 is in the position of FIG. 8. The springs 76 and 86 are calibrated to operate at different pressures. Thus, the spring 76 may exert around 70 pounds pressure on the valve 77 while the spring 86 may exert a pressure of around 65 pounds on the valve 85. However, the loading of these springs is predetermined in accordance with the determination of the safe operating pressure of the air in the brake system, that is, according to the pressure in the system at which it is desired to automatically apply the brakes. The particular differential loading of the springs may thus be varied according to a predetermined standard of automatically applying the brakes through the auxiliary braking system. Ordinarily, the normal operating pressure of such a fluid system would be around 100 pounds per square inch with predetermined automatic application of the brakes when the pressure completely fails or falls somewhat below 65 pounds per square inch.

In the position of the valves in FIG. 6, the pressure in the conduit 62, which is in communication with the tank 18, is either zero or below the predetermined safe operating level. In this position of the valves, the valve 77 closes communication between the conduit 62 and the conduit 61 leading to the diaphragm 23. In this position of the valve 85, the conduit 21 is in communication with the exhaust ports 90, 90a, 90b through the bore 80 so that any pressure behind the diaphragms in the diaphragm housings 23 is vented and the spring 40 is expanded to the position of FIG. 2, thus shifting the brake lever 14 to the full line "on" position of FIG. 3 to automatically apply the brakes under influence of the spring 40.

After the pressure builds up to a normal operating level in the tank 18, the pressure in the conduit 62 will initially enter the bore 80 through the port 79 and elevate the valve 85 to the position of FIG. 7 closing communication between the conduit 21 and the vent ports. Thereafter, and in sequence, the valve 77 will be elevated against its spring 76 to the position of FIG. 8 affording communication between the conduit 62 through the bore 68 and past the check valve 69 into the conduit 61 which, in turn, is in communication with the conduit 21 leading to the diaphragm housing. Thus, with the valves 77 and 85 in the position shown in FIG. 8, the normal operating pressure in the brake system will find its way from the tank 18 into the diaphragm housing 23 to shift the diaphragms into connected rods 26 to the position of FIG. 4 in which the spring 40 is compressed and the auxiliary brake operating rod 37 is shifted to the position shown in FIG. 5 where the brake lever 14 may be operated in conventional manner through the conventional operating rod 16 by reason of the lost motion or play provided between the pins 50 and the clevis element 38, this being provided by the slots 39.

Should the pressure in the system fail or fall below the predetermined safe operating level, the stored energy of the spring 76 will shift the valve 77 to the position of FIG. 6 closing communication between the conduits 62 and 61; and in short sequence, the valve 85 will be shifted by the stored energy of its spring 86 also to the position of FIG. 6 opening the port 91. In this position of the valve 85, the conduit 21, which leads to the diaphragm housings 23, is vented through the exhaust ports 90, 90a, 90b, thus to relieve any pressure behind the diaphragms and allow the springs 40 to shift to the brake applying position of FIG. 2.

The auxiliary braking mechanism can also be set into operation for applying the brakes by manually depressing the push member 84 and this will shift the valve 85 from the position of FIGS. 7 or 8 to the position of FIG. 6 venting the diaphragm housings from the conduit 21 through the exhaust ports 90, 90a, 90b. When a vehicle is parked, as for instance on a slope, and the compressor stopped, should the pressure in the brake system fall below the predetermined safe operating level, the brakes will be automatically applied by shifting of the valve members in the manner pointed out above when the truck is in motion.

While certain forms of the invention have been shown for purposes of illustration, it is to be clearly understood that various changes in the details of construction and arrangement of parts may be made without departing from the spirit and scope of the invention as set forth in the appended claims.

I claim:

1. An auxiliary brake applying mechanism adapted for use with a force applying brake lever and comprising an auxiliary brake operating rod having a lost motion operative association with the brake lever, spring means connected to said brake operating rod and compressible to a preloaded position to shift the rod to an inoperative position with respect to normal operation of the brake lever, diaphragm means connected to said spring means, conduit means connecting said diaphragm means with a source of fluid pressure, a housing having a first bore in constant communication with said conduit means, a first valve member in said first bore controlling a lateral passage in the housing, a second bore in said housing in constant communication with said first bore, a second valve member in said second bore, a third bore in communication with said lateral passage and with said diaphragm means, respectively, said housing having a pair of ports spaced from the point of communication between said first and second bores and spaced from each other and communicating with one another through said second bore with one port leading to the diaphragm means and the other port venting to atmosphere, valve springs urging said first and second valve members to positions respectively closing said lateral passage and opening the port leading to the diaphragm means with a force tending to shift the valve members to the aforesaid positions when the pressure of fluid falls below a predetermined safe operating level and said valve members being shifted against the action of the valve springs by the fluid pressure when it is above the predetermined safe operating level for opening said lateral passage to effect compression of the spring means by said diaphragm means and for closing the port leading to the diaphragm means whereby, upon failure of the pressure to below the predetermined safe operating level, the valve springs urge said first and second valve members to the aforesaid positions with the said one port leading to the diaphragm means communicating through the second bore with the said other port venting to atmosphere whereby to vent the diaphragm means and permit the spring means to expand and actuate the brake operating rod.

2. An auxiliary brake applying mechanism as claimed in claim 1, wherein check valve means is positioned within said third bore permitting passage of fluid under pressure to the diaphragm means but preventing reverse flow of fluid under pressure.

3. An auxiliary brake applying mechanism as claimed in claim 1, wherein the second valve member has associated therewith a manual operator disposed exteriorly of the housing and by which the second valve member can be shifted to a position affording communication between the said pair of ports for venting the diaphragm and permitting the spring means to expand and apply the brakes.

4. An auxiliary brake applying mechanism as claimed in claim 1, wherein the said valve springs are calibrated to operate at differential pressures with the valve spring for the second valve member exerting a lesser force thereon.

5. In a vehicle having wheels equipped with a brake operating lever connected to a diaphragm operator in a diaphragm housing communicating with a source of fluid under pressure in the brake system; the provision of an auxiliary safety brake applying mechanism comprising an auxiliary brake operating rod having a lost motion operative association with each brake lever, spring means connected to said brake operating rod and compressible to a preloaded position to shift the rod to an inoperative position with respect to normal operation of the brake lever, diaphragm means connected to said spring means, conduit means connecting said diaphragm means with the source of fluid pressure in the brake system, and a compact valve means assembly in communication with the conduit means between the source of fluid pressure and the diaphragm means respectively, said valve means assembly including a housing with one port in communication with the source of fluid pressure in the brake system and with additional ports in communication with said diaphragm means, said housing further including a vent port adapted for communication with one of said additional ports, a pair of valve members in said housing selectively controlling the passage of fluid under pressure to and from said diaphragm means, both said valve members being shiftable under influence of a predetermined safe operating fluid pressure in the brake system to a position with one of said valve members affording communication between the said one port and the diaphragm means through another of said additional ports to effect compression of said spring means and with the other of said valve members shiftable to a position preventing venting of said diaphragm means, and spring means urging the said other valve member to another position upon decrease in fluid pressure below the predetermined safe operating level in the brake system for venting the said diaphragm means through said one additional ports and said vent port to the atmosphere whereby to permit said spring means to expand and automatically shift the brake operating rod to a position for applying the vehicle brakes through the associated brake levers.

6. An auxiliary brake applying mechanism for use with a force applying brake lever; and comprising an auxiliary brake operating rod having a lost motion operative association with the brake lever, spring means connected to the brake operating rod and compressible to a preloaded position to shift the rod to an inoperative position allowing normal operation of the brake lever independently of the brake operating rod through the said lost motion association therewith, diaphragm means connected to said spring means, conduit means connecting said diaphragm means with a source of fluid pressure; and valve means interposed in the conduit means between the source of fluid pressure and the diaphragm means and including a valve housing having a pair of separately controlled diaphragm access ports in communication with the conduit means and diaphragm means, respectively, an inlet port communicating with the conduit means and vent means in said housing adapted for communication with one of said access ports; and said valve means including plural valve members selectively and automatically sequentially operable in response to the pressure of fluid from the source through said inlet port with one valve member operable in response to the fluid pressure above a predetermined safe operating level for maintaining constant communication between the fluid pressure source and the diaphragm means through the other of said access ports for compressing the said spring means to preloaded condition, and with another of said valve members maintained by the safe operating level of the fluid pressure at source to close the said one access port against communication with said vent means, both said valve members being shiftable upon a decrease in fluid pressure at source below the predetermined safe operating level to positions with said one valve member closing communication between the inlet port and said other access port and with the other valve member opening the said one access port for communication with said vent means to vent the diaphragm means to atmosphere and release the previously compressed spring means to shift the brake operating rod into position to operate the brake lever.

7. An auxiliary brake applying mechanism as claimed in claim 6, wherein the said valve members are differentially spring loaded to prevent venting of the diaphragm means prior to admission of fluid pressure thereto.

8. An auxiliary brake applying mechanism as claimed in claim 6, wherein each of said valve members are spring urged in opposition to influence of the fluid pressure thereon.

9. An auxiliary brake applying mechanism as claimed in claim 8, wherein the valve member controlling venting of the diaphragm means is spring urged with less force than that of the other valve member.

10. An auxiliary brake applying mechanism as claimed in claim 6, wherein a manual operator disposed exteriorly of the housing is connected with the said another valve member to permit shifting thereof manually to effect shifting of the brake operating rod into a position to operate the brake lever.

11. An auxiliary brake applying mechanism as claimed in claim 6, wherein check valve means is positioned between said one valve member and said one access port permitting passage of fluid under pressure only in the direction toward the diaphragm means.

References Cited in the file of this patent

UNITED STATES PATENTS

| | | |
|---|---|---|
| 1,997,807 | Bird | Apr. 16, 1935 |
| 2,211,890 | Farmer | Aug. 20, 1940 |
| 2,409,908 | Simpkins | Oct. 22, 1946 |
| 2,645,313 | Schaadt | July 14, 1953 |
| 2,845,148 | Sturgill | July 29, 1958 |
| 2,907,415 | Norman | Oct. 6, 1959 |
| 2,914,144 | Hovell | Nov. 24, 1959 |